United States Patent
Abundis (10) Patent No.: US 6,950,214 B2
(45) Date of Patent: Sep. 27, 2005

(54) SYSTEM AND METHODS FOR COUPLING A MEDIA ADAPTER TO AN IMAGING DEVICE

(75) Inventor: Gerardo Orozco Abundis, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/650,529

(22) Filed: Aug. 27, 2003

(65) Prior Publication Data

US 2005/0037669 A1 Feb. 17, 2005

(51) Int. Cl.[7] .................................................. H04N 1/04
(52) U.S. Cl. .................................................. 358/487
(58) Field of Search .................................. 358/487, 475, 358/497; 355/22, 50, 71; 362/260; 359/896

(56) References Cited

U.S. PATENT DOCUMENTS

| | | | | |
|---|---|---|---|---|
| 4,470,077 A | * | 9/1984 | Komine | ........................ 386/118 |
| 4,908,637 A | * | 3/1990 | Chung et al. | ................. 347/138 |
| 5,251,072 A | * | 10/1993 | Fukuoka et al. | ............. 359/896 |
| 5,467,172 A | * | 11/1995 | Liao | ............................ 399/380 |
| 5,625,555 A | | 4/1997 | Davis | |
| 5,652,665 A | | 7/1997 | Chen et al. | |
| 5,986,774 A | | 11/1999 | Han | |
| 6,163,385 A | | 12/2000 | Kajander | |
| 6,392,761 B1 | | 5/2002 | Suzuki et al. | |
| 6,417,937 B1 | | 7/2002 | Batten et al. | |
| 6,426,823 B1 | | 7/2002 | Hsiao et al. | |

* cited by examiner

*Primary Examiner*—Phuong Dnh (57) ABSTRACT

System and methods for coupling a media adapter to an imaging device. One embodiment of a system comprises an imaging device and a coupler on the imaging device. A signal link is established between the imaging device and the coupler on the imaging device. The system also comprises a media adapter. A mating coupler on the media adapter contacts the signal link when the mating coupler on the media adapter is connected to the coupler on the imaging device.

35 Claims, 5 Drawing Sheets

SYSTEM AND METHODS FOR COUPLING A MEDIA ADAPTER TO AN IMAGING DEVICE

FIELD OF THE INVENTION

The invention generally pertains to imaging devices, and more specifically, to system and methods for coupling media adapters to imaging devices.

BACKGROUND

Imaging devices, such as scanners, copiers, facsimile machines, multipurpose machines, etc., are readily commercially available for converting tangible images (e.g., documents, photographs, etc.) or images of objects (e.g., the cover of a book) into electronic images. These imaging devices operate by generating light from a light source in the imaging device and reflecting this light off of the surface of the tangible image or object. The reflected light is collected on an array of photosensitive elements (e.g., a charge coupled device (CCD)), which convert the reflected light into electronic signals representing the image.

Imaging devices, such as the type described above, may be provided with media adaptors to adapt the imaging device for use with different types of media. For example, back lighting (e.g., cathode fluorescent light bulbs) may be provided to back light transparent images, such as overhead transparencies and photo negatives. Other types of media adapters may also be provided, for example, having mirrors, lenses and/or other optics for transferring the image to the photosensitive elements.

The media adaptor may require electrical power (e.g., to power the back lighting), and a separate power cord is typically provided for this purpose. However, power cords are aesthetically unpleasing and may become entangled with the imaging device or other devices.

Alternatively, the media adaptor may be provided with batteries. However, batteries increase the size of the media adapter. In addition, battery power may not provide the type of consistent lighting desired for imaging operations. Battery operation can also be expensive, as the user has to regularly replace the batteries.

SUMMARY OF THE INVENTION

A system may comprise an imaging device, and a coupler on the imaging device. A signal link may be established between the imaging device and the coupler on the imaging device. The system may also comprise a media adapter. A mating coupler on the media adapter contacts the signal link when the mating coupler on the media adapter is connected to the coupler on the imaging device.

A method for coupling a media adapter to an imaging device may comprise: positioning the media adapter adjacent a coupler on the imaging device, connecting a mating coupler on the media adapter to the coupler on the imaging device to mechanically couple the media adapter to the imaging device, and establishing a signal link between the mating coupler on the media adapter and the imaging device.

BRIEF DESCRIPTION OF THE DRAWINGS

Illustrative and presently preferred embodiments of the invention are shown in the drawings, in which.

DETAILED DESCRIPTION

Figure 1:
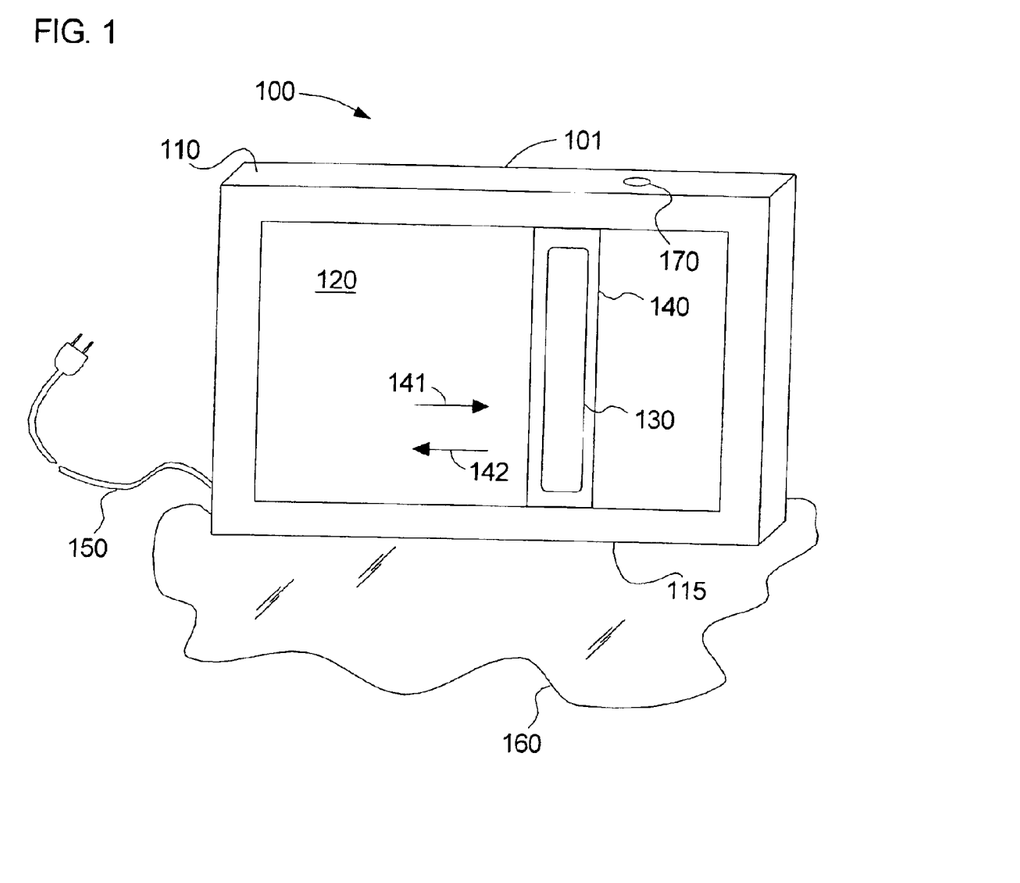
FIG. 1 is a perspective view of an embodiment of an imaging device that may be used according to the teachings of the invention.

According to one exemplary embodiment, imaging device 100 may comprise a flat bed scanner, such as the flatbed scanner 101 shown in FIG. 1. Although the invention will be described herein with reference to flatbed scanner 101 for purposes of illustration, it is understood that the invention is not limited to use with this flat bed scanner. For example, imaging device 100 may comprise handheld scanners, copiers, facsimile machines, multipurpose machines, digital imagine machines, and other electronic devices for capturing a digital image.

Flatbed scanner 101 is shown in FIG. 1 comprising a housing 110 having an imaging surface 120 (e.g., glass platen). A cover (removed to show the imaging surface in FIG. 1) may also be provided to open and close over the imaging surface 120. Flatbed scanner 101 may also comprise a light source 130 mounted on a carriage 140 within the housing 110 beneath the imaging surface 120. Carriage 140 is operable to move the light source 130 (e.g., in the directions illustrated by arrows 141 and 142) to illuminate objects placed adjacent the imaging surface 120. Power cord 150 provides electrical power to the flatbed scanner 101. By way of example, power cord 150 may be provided for use with a conventional AC power outlet. Power cord 150 may be connected through the side of housing 110 to a DC power converter 330 (shown in FIGS. 3(b) and 4(b)).

According to one embodiment, flatbed scanner 101 may be a vertically-oriented scanner. That is, flatbed scanner 101 may be positioned upright with one of its sides 115 adjacent surface 160 (e.g., a desktop). Another embodiment of a vertically-oriented flatbed scanner (not shown) may be positioned in an easel so that the scanner is maintained in a substantially vertical orientation. Vertically-oriented flatbed scanners are commercially available, such as the HP Scanjet 4670 from the Hewlett Packard Company. Vertically-oriented scanners may be used for saving space in a crowded work environment (e.g., a desktop). It is understood, however, that the invention is not limited to use with vertically-oriented scanners and can be used with imaging devices 100 operable in a variety of different orientations.

It will be readily appreciated that imaging device 100, such as the flatbed scanner 101 shown in FIG. 1 and described above, may also be provided with various ancillary devices. For example, imaging devices may be equipped with automatic document feeders, paper trays, I/O ports, output trays, LCD displays, and/or keypads to name only a few. These and other ancillary devices are commonly associated with imaging devices, and therefore are not shown or described herein as their description is not needed for a full understanding of, or to practice the invention.

The foregoing description of imaging device 100 and flatbed scanner 101 in particular, is provided as an illustration of one embodiment of an environment in which the invention may be used. It should be understood, however, that the present invention may be used in conjunction with any of a wide range of other types and configurations of imaging devices that are now known or that may be developed in the future.

Figure 2A:
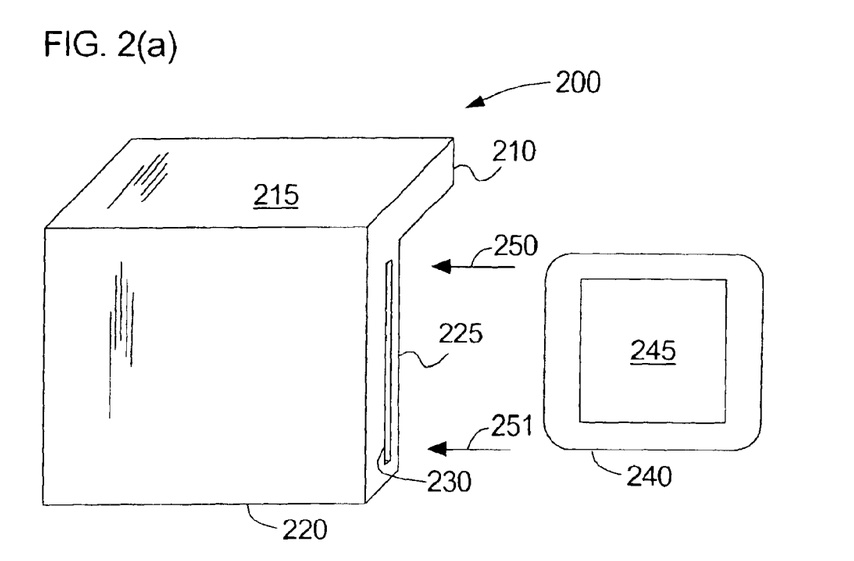
FIG. 2(a) is a front perspective view of one embodiment of a media adapter that may be used with the imaging device shown in FIG. 1.
Figure 2B:
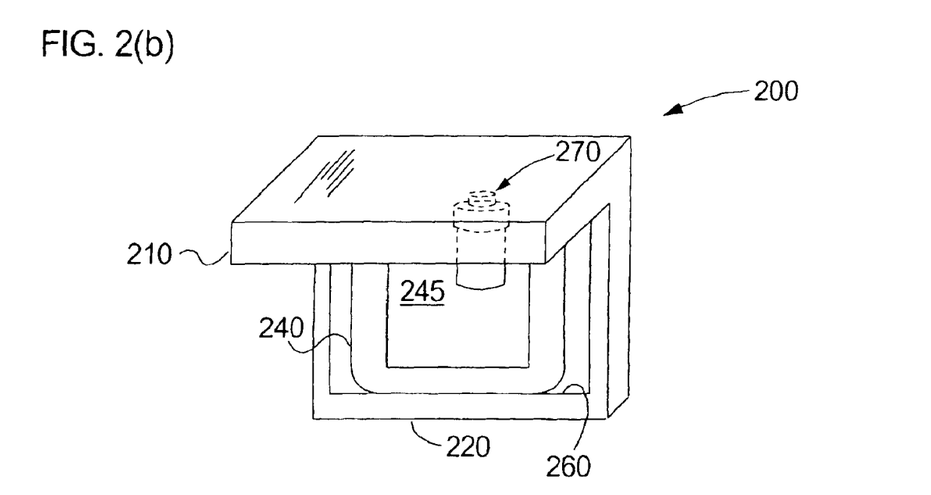
FIG. 2(b) is a rear perspective view of the media adapter shown in FIG. 2(a)

Referring now to FIGS. 2(*a*) and (*b*), a media adapter 200, such as may be used for imaging transparent or semi-transparent objects 240 (e.g., a 35 mm slide), is shown. Media adapter 200 may be used according to the teachings of the invention with the flatbed scanner 101 shown in FIG. 1 and described above.

The embodiment of media adapter 200 shown is generally of an L-shaped, rectangular configuration. According to this embodiment, media adapter 200 comprises a top portion 210 and side portion 220. Media adapter 200 may be positioned with side portion 220 adjacent imaging surface 120, as will be described in more detail below with regard to FIGS. 3(*a*) and (*b*) through FIGS. 4(*a*) and (*b*).

Side portion 220 of media adapter 200 may comprise a media slot 230 formed therein. Media slot 230 is configured to receive media 240 within the side portion 220 of media adapter 200. For example, media 240 may be a 35 mm slide having a semi-transparent film image 245. The 35 mm slide can be inserted into the media slot 230 of the media adapter 200, as illustrated by arrows 250, 251. Alternatively, media slot 230 may be formed through the top surface 215 of the media adapter 200 so that the media 240 can be "dropped" into the side portion 220 of the media adapter 200.

Side portion 220 houses, internally, a light source (e.g., a fluorescent or other white light source, not shown) for backlighting the media 240 received in media slot 230. Side portion 220 may also house a diffuser (e.g., frosted glass, not shown) provided between the light source and media 240 when the media 240 is received in media slot 230. Diffusers for use with media adapters function to diffuse light emanating from the light source and distribute the light evenly over the image 245 of media 240. Window 260 is formed through side portion 220 so that light passing through the image 245 of media 240 is projected onto the imaging surface 120 of imaging device 100. Optionally, window 260 may be covered with a transparent material (e.g., glass or clear plastic).

Although media adapter 200 has been shown as it may be used with a 35 mm slide, media adapter 200 may be configured for use with any of a wide variety of media (e.g., overhead transparencies, film negatives) and is not limited to use with 35 mm slides.

In operation, light originating at the light source in media adapter 200 is projected through the diffuser, image 245, and window 260 formed through the side portion 220, and then onto the imaging surface 120 of the imaging device 100. The light passes through the imaging surface 120 and onto photosensitive elements on the carriage 140. These photosensitive elements are the same as those which already exist on the conventional carriage 140 for receiving light reflected off of an opaque object being imaged on the imaging surface 120. An arrangement of lenses and mirrors may be provided to focus the light onto the photosensitive elements. Operation of media adapter 200 for imaging objects is known and further description is not necessary for a full understanding of, or to practice the invention.

Power for the media adapter 200 (e.g., the internal light source) is supplied through a link established between coupler 170 on the imaging device 100 (FIG. 1) and a mating coupler 270 on the media adapter 200 shown in FIG. 2(*b*). Mating coupler 270 may also be used to mechanically connect the media adapter 200 to the housing 110 of imaging device 100, as will now be described with reference to FIGS. 3(*a*) and (*b*) through FIGS. 4(*a*) and (*b*).

Figure 3A:
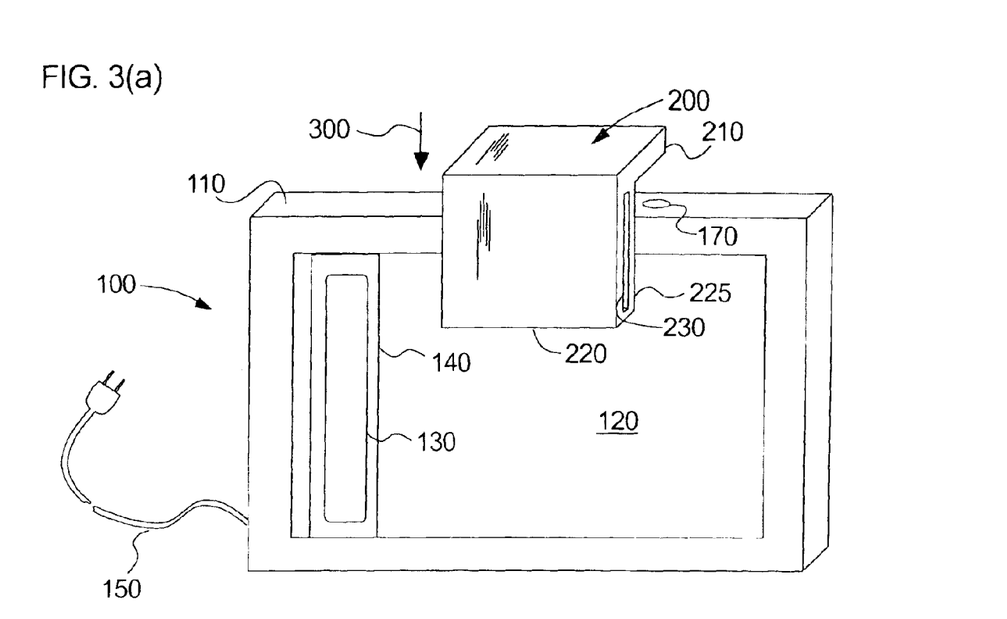
FIG. 3(a) is a front perspective view of the embodiment of media adapter shown in FIGS. 2(a) and (b), positioned adjacent the imaging device shown in FIG. 1.
Figure 3B:
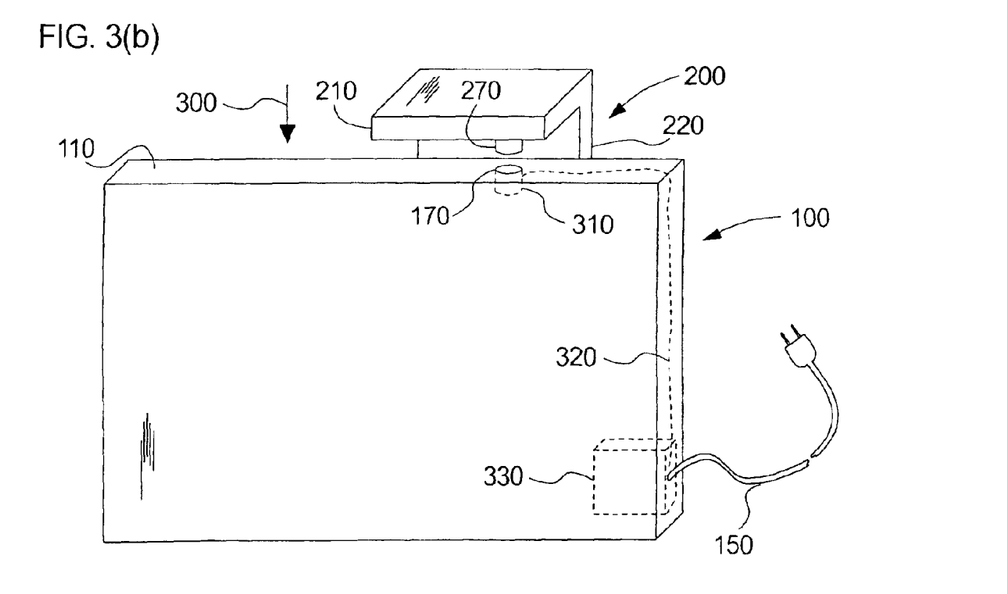
FIG. 3(b) is a rear perspective view of the media adapter positioned adjacent the imaging device as in FIG. 3(a)

As previously mentioned, imaging device 100 comprises a coupler 170. One embodiment of coupler 170 is a chamber formed in the housing 110 of imaging device 100, such as the generally cylindrical shaped chamber shown in FIGS. 3(*a*) and (*b*). Also as previously mentioned, media adapter 200 comprises a mating coupler 270. One embodiment of mating coupler 270 is a protrusion embedded in, or otherwise mounted to, the top portion 210 of media adapter 200.

Figure 4A:
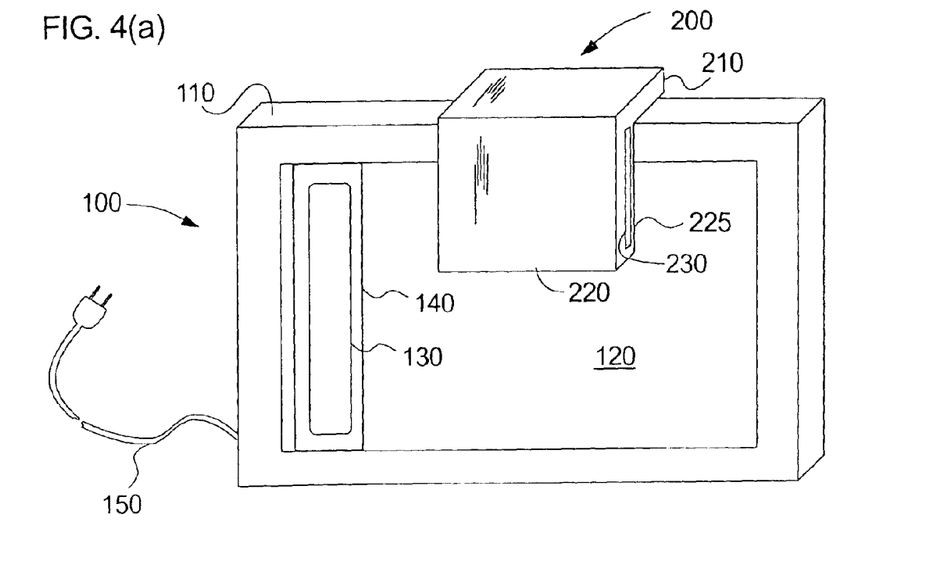
FIG. 4(a) is a front perspective view of the embodiment of media adapter shown in FIGS. 2(a) and (b), coupled to the imaging device shown in FIG. 1.
Figure 4B:
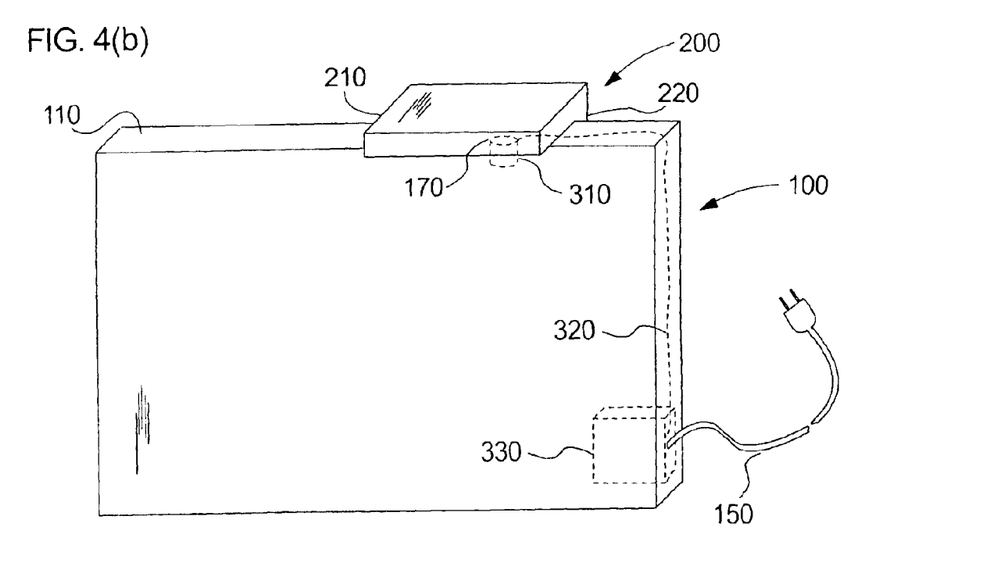
FIG. 4(b) is a rear perspective view of the media adapter coupled to the imaging device as in FIG. 4(a)

Mating coupler 270 is configured to be slidably received within coupler 170. Accordingly, the mating coupler 270 on media adapter 200 can be connected to the coupler 170 on imaging device 100 to mechanically couple the media adapter 200 to the imaging device 100, as described in more detail below and shown in FIGS. 4(*a*) and (*b*).

Coupler 170 and mating coupler 270 can be provided on the imaging device 100 and media adapter 200 so that when a connection is made there between, the media adapter 200 is aligned on the imaging device 100 (e.g., adjacent the imaging surface 120) in a predetermined position. Hence, the coupler 170 and mating coupler 270 can be used to automatically align the media adapter 200 on the imaging device 100.

It is understood that coupler 170 and mating coupler 270 are not limited to any particular configuration, and the cylindrical configuration of coupler 170 and mating coupler 270 are shown herein merely as illustrative of one embodiment of the invention. For example, coupler 170 and mating coupler 270 may comprise other shapes. As another example, the protrusion and recess (i.e., male/female) elements may be switched. Yet another embodiment will be described below with regard to FIG. 6, although still other embodiments are also contemplated as being within the scope of the invention.

Coupler 170 may also be linked to a power source for imaging device 100. For example, coupler 170 is shown in FIG. 3(*b*) electrically linked to the power converter 330 by insulated wire(s) 320. Mating coupler 270 is also linked to the electrical components of media adapter 200, such as the internal light source. Accordingly, when media adapter 200 is mechanically coupled to the imaging device 100, an electrical signal link is established between the power converter 330 for the imaging device 100 and the electrical components of media adapter 200. No external power cords need to be provided for supplying electrical power to the media adapter 200.

Of course it is understood that the invention is not limited to delivering electrical power from the imaging device 100 to the media adapter 200. In other embodiments, suitable signal links may also be provided for delivering control signals between the media adapter 200 and the imaging device 100. By way of example, these control signals may be used to turn on or off a lamp in the media adapter or set the lamp to a standby mode, adjust the light emitted by the media adapter based on the type of media being scanned (e.g., film negatives or overhead transparencies), activate or deactivate an indicator (e.g., an LED status light) on the media adapter, or control other functions of the media adapter or components of the media adapter. Suitable control signals may comprise electrical, optical (e.g., infrared (IR)), opto-electrical, radio frequency (RF), and audible signals, to name only a few.

Having described embodiments of an apparatus for coupling a media adapter to an imaging device, embodiments of a method for coupling the media adapter to the imaging device will now be described with reference to FIGS. 3(*a*) and (*b*) through FIGS. 4(*a*) and (*b*).

Media adapter 200 may be coupled to imaging device 100 according to one embodiment of the invention as follows. The media adapter 200 may be positioned adjacent the imaging device 100 with the mating coupler 270 on the media adapter 200 substantially aligned with the coupler 170 on the imaging device 100. For example, mating coupler 270 may be positioned adjacent the opening of coupler 170 formed in the housing 110 of imaging device 100. The media adapter 200 may then be moved toward the imaging device 100 in the direction illustrated by arrow 300 in FIGS. 3(*a*) and (*b*). As the media adapter 200 is moved toward the imaging device 100, the mating coupler 270 is received by the coupler 170.

Mating coupler 270 and coupler 170 engage one another and mechanically couple the media adapter 200 to the imaging device 100. This mechanical coupling allows the media adapter 200 to be readily positioned adjacent various types and orientations of imaging devices. For example, the media adapter 200 can be readily coupled to the vertical flatbed scanner 101 shown in FIG. 1. In addition, this mechanical coupling also allows the media adapter 200 to be automatically aligned on the scanning surface 120 of the imaging device 100. The user does not have to guess the best position for the media adapter on the imaging surface 120 of the imaging device 100. Further, the user does not have to use an alignment template for properly positioning the media adapter 200 on the imaging surface 120. Instead, the media adapter 200 is coupled to the imaging device 100 at a predetermined position on the imaging surface 120.

In addition, when mating coupler 270 and coupler 170 engage one another, mating coupler 270 may establish an electrical connection with the imaging device 100. Accordingly, electrical power can be provided to the media adapter 200 over the electrical link 320 to the imaging device 100 without having to provide a separate power cord for the media adapter 200. Control signals may also be delivered between the media adapter 200 and the imaging device 100 via electrical link 320 (e.g., for activating/deactivating back lighting in the media adapter 200).

Figure 5:
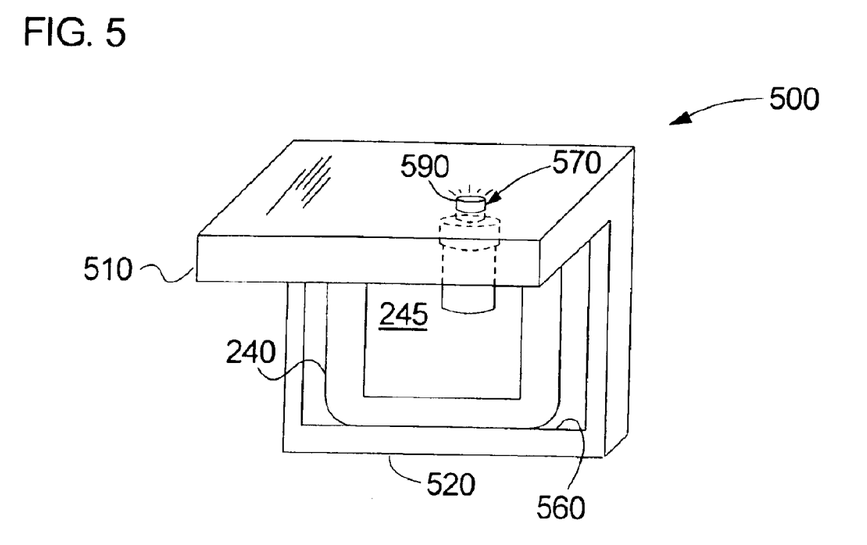
FIG. 5 is an alternative embodiment of a media adapter that can be coupled to the imaging device according to the teachings of the invention.

An alternative embodiment of media adapter 500 is shown in FIG. 5 as it may be used according to the teachings of the present invention. It is noted that five hundred series numbers are used to designate like elements as those already described in detail above. That is, media adapter 500 may comprise top portion 510, side portion 520, window 560, and mating coupler 570. Media adapter 500 is again shown with the 35 mm slide 240 received within side portion 520.

According to this embodiment, media adapter 500 may also comprise a signaling device 590, such as the light emitting diode (LED) shown in FIG. 5. During operation, the LED may light to indicate to the user that the media adapter 500 is properly coupled to the imaging device 100 (i.e., that the mating coupler 570 is seated in coupler 170 so as to establish an electrical connection).

It should be noted that signaling device 590 is not limited to an LED. For example, a suitable modification may comprise output on an LCD display on the media adapter or even a device for emitting an audible tone. In addition, signaling device 590 can be mounted to the imaging device 100.

Figure 6:
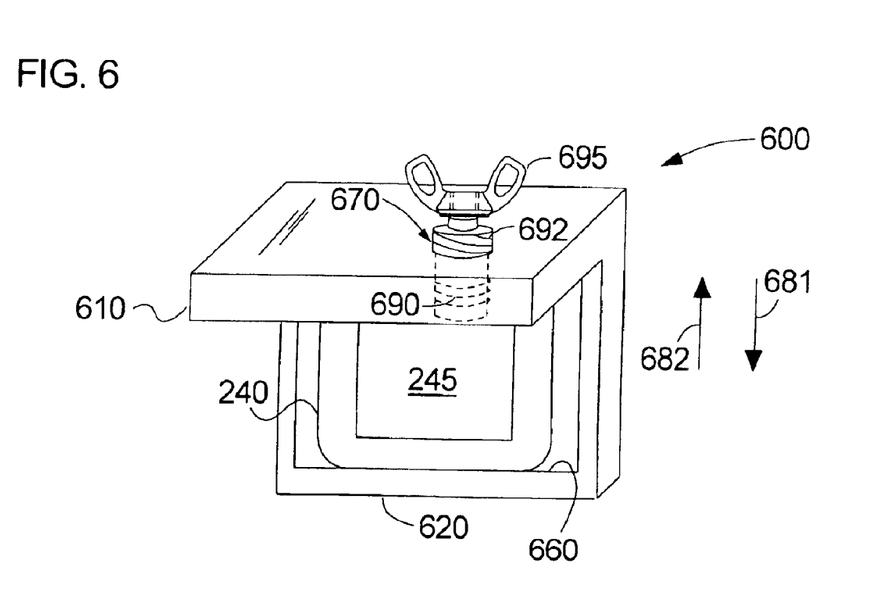
FIG. 6 is another alternative embodiment of a media adapter that can be coupled to the imaging device according to the teachings of the invention.

Another alternative embodiment of media adapter 600 is shown in FIG. 6 as it may be used according to the teachings of the present invention. It is noted that six hundred series numbers are used to designate like elements as those already described in detail above. That is, media adapter 600 may comprise top portion 610, side portion 620, window 660, and mating coupler 670. Media adapter 600 is again shown with the 35 mm slide 240 received within side portion 620.

According to this embodiment, mating coupler 670 is movable within media adapter 600. Mating coupler 670 may be provided with an optional spring 690 to spring-bias mating coupler 670 within the top portion 610 of media adapter 600. Mating coupler 670 may also comprise a threaded portion 692, and a handle 695.

In operation, media adapter 600 may be positioned adjacent the imaging device 100, as previously described. The user exerts a force on (e.g., by pushing) the mating coupler 670 toward the coupler 170 on the imaging device 100 in the direction illustrated by arrow 681. The user then turns the handle 695 (e.g., in a clockwise direction) causing the threaded portion 692 to engage threads in the coupler 170 and lock the mating coupler 670.

This embodiment allows the mating coupler to securely fit to coupler 170 on the imaging device 100. This embodiment also allows the mating coupler 670 to be automatically removed from the imaging device 100. That is, when the user turns the handle 695 (e.g., in a counter-clockwise direction), the threaded portion 690 releases the mating coupler 670 from the coupler 170 in the imaging device 100 and the spring 690 biases the mating coupler 670 away from the coupler 170 in the direction illustrated by arrow 682.

In another embodiment, thread 692 may be provided to engage thread in media adapter 600 and lock the mating coupler 670 in an extended position (e.g., for positioning in coupler 170). Yet other embodiments are also contemplated as being within the scope of the invention as will become readily apparent to those skilled in the art after having become familiar with the teachings of the present invention.

Having herein set forth preferred embodiments of the present invention, it is anticipated that suitable modifications can be made thereto which will nonetheless remain within the scope of the present invention.

What is claimed is:

1. A method for coupling a media adapter to an imaging device, comprising:
    positioning the media adapter adjacent a coupler on the imaging device;
    receiving a media object inside the media adapter;
    connecting a mating coupler on the media adapter to the coupler on the imaging device to mechanically couple the media adapter to the imaging device; and
    establishing a signal link between the mating coupler on the media adapter and the imaging device.

2. The method of claim 1, further comprising delivering electrical power to the media adapter over the signal link to the imaging device.

3. A method for coupling a media adapter to an imaging device, comprising:
    positioning the media adapter adjacent a coupler on the imaging device;

connecting a mating coupler on the media adapter to the coupler on the imaging device to mechanically couple the media adapter to the imaging device;

establishing a signal link between the mating coupler on the media adapter and the imaging device;

delivering electrical power to the media adapter over the signal link to the imaging device; and delivering control signals between the media adapter and the imaging device over the signal link.

4. The method of claim 1, wherein the media adapter is automatically aligned on a surface of the imaging device when the mating coupler on the media adapter is connected to the coupler on the imaging device.

5. The method of claim 1, wherein positioning the media adapter is adjacent a vertically-oriented imaging device.

6. The method of claim 1, further comprising indicating to a user when the mating coupler on the media adapter contacts the signal link to the imaging device.

7. A system comprising:
an imaging device;
a coupler on the imaging device;
a signal link established between the imaging device and said coupler on the imaging device;
a media adapter; and
a mating coupler on the media adapter, said mating coupler contacting said signal link when said mating coupler on the media adapter is connected to said coupler on the imaging device, the signal link to communicate electrical power and control signals to the media adapter.

8. The system of claim 7, wherein said mating coupler on the media adapter and said coupler on the imaging device mechanically and electrically couple the media adapter to the imaging device.

9. The system of claim 7, wherein the media adapter is automatically aligned with a surface of the imaging device when said mating coupler on the media adapter and said coupler on the imaging device are connected.

10. The system of claim 7, wherein said signal link is to an electrical power source in the imaging device.

11. The system of claim 10, wherein electrical power is delivered to the media adapter via said signal link from the electrical power source in the imaging device.

12. The system of claim 7, wherein said signal link is to a controller in the imaging device.

13. The system of claim 12, wherein control signals are delivered between the media adapter and the controller in the imaging device over said signal link.

14. The system of claim 7, wherein said signal link is selected from the following: electrical link, optical signal link, opto-electrical signal link, audible signal link.

15. The system of claim 7, wherein the media adapter is cordless.

16. The system of claim 7, wherein the media adapter is substantially L-shaped for positioning on the imaging device.

17. The system of claim 7, wherein the imaging device is substantially vertically oriented.

18. The system of claim 7, further comprising an indicator on said media adapter, said indicator indicating to said user that the media adapter is connected to the imaging device.

19. An apparatus for coupling a media adapter to an imaging device, comprising:
positioning means for automatically aligning the media adapter adjacent a scanning surface of the imaging device; and coupling means for mechanically coupling the media adapter to the imaging device after the media adapter is automatically aligned adjacent the scanning surface of the imaging device; and linking means for electrically linking the media adapter to the imaging device, said linking means integral with said coupling means, the linking means for communicating control signals to the media adapter and for providing electrical power to the media adapter.

20. The apparatus of claim 19, further comprising means for indicating to a user when the media adapter is electrically linked to the imaging device.

21. The method of claim 1, wherein receiving the media object inside the media adapter comprises receiving the media object in a slot of the media adapter.

22. The method of claim 21, wherein receiving the media object in the slot of the media adapter comprises receiving at least one of a transparent and semi-transparent media object in the slot.

23. The method of claim 1, further comprising:
activating a light source in the media adapter; and
backlighting the media object in the media adapter with light from the light source.

24. The method of claim 23, wherein backlighting the media object comprises backlighting the media object through a diffuser in the media adapter.

25. The method of claim 3, wherein delivering control signals over the signal link comprises delivering control signals to turn on or off a light source in the media adapter.

26. The method of claim 25, wherein delivering control signals over the signal link comprises delivering further control signals to adjust light emitted from the light source in the media adapter.

27. The method of claim 3, wherein delivering electrical power comprises delivering electrical power from a power source in the imaging device to the media adapter, and wherein delivering control signals comprises delivering control signals from a controller in the imaging device to the media adapter.

28. The system of claim 7, wherein the imaging device comprises a controller and a power source, the signal link to communicate electrical power from the power source of the imaging device to the media adapter, and the signal link to communicate the control signals from the controller to the media adapter.

29. The system of claim 7, wherein the media adapter has a slot to receive a media object to be imaged.

30. The system of claim 29, wherein the media adapter has a light source to backlight the media object in the slot of the media adapter.

31. The apparatus of claim 19, wherein the linking means is for providing electrical power from a power source in the imaging device to the media adapter, and the linking means is for communicating control signals from a controller in the imaging device to the media adapter.

32. An apparatus for use with an imaging device having a power source and a coupler, comprising:
a media adapter having a mating coupler to mechanically and electrically connect to the coupler of the imaging device, the media adapter further having a slot to receive a media object; and a link established between the mating coupler of the media adapter and the coupler of the imaging device, the link to provide electrical power from the imaging device to the media adapter.

33. The apparatus of claim 32, wherein the media adapter further comprises a light source to backlight the media object in the media adapter.

34. The apparatus of claim 33, wherein the link is adapted to communicate control signals from a controller in the imaging device to turn on or off the light source.

35. The apparatus of claim 34, wherein the link is adapted to communicate further control signals from the controller in the imaging device to adjust light emitted from the light source.

* * * * *